US008581832B2

(12) United States Patent
Fratti et al.

(10) Patent No.: US 8,581,832 B2
(45) Date of Patent: Nov. 12, 2013

(54) ILLUMINATION DEVICE HAVING USER-CONTROLLABLE LIGHT SEQUENCING CIRCUITRY CONFIGURED TO SELECT A LIGHT SEQUENCING MODE

(75) Inventors: Roger A. Fratti, Mohnton, PA (US); Joseph Michael Freund, Fogelsville, PA (US)

(73) Assignee: LSI Corporation, San Jose, CA (US)

( * ) Notice: Subject to any disclaimer, the term of this patent is extended or adjusted under 35 U.S.C. 154(b) by 163 days.

(21) Appl. No.: 13/214,365

(22) Filed: Aug. 22, 2011

(65) Prior Publication Data

US 2013/0050297 A1 Feb. 28, 2013

(51) Int. Cl.

| | |
|---|---|
| ***G09G 3/36*** | (2006.01) |
| ***G09G 5/10*** | (2006.01) |
| ***A47B 19/00*** | (2006.01) |
| ***F21V 7/04*** | (2006.01) |
| ***G02F 1/1335*** | (2006.01) |

(52) U.S. Cl.
USPC ............. 345/102; 362/98; 362/600; 362/631; 362/632; 362/633; 362/364; 345/690; 345/691; 349/65

(58) Field of Classification Search
USPC .................. 345/690–691, 102; 362/600–634, 362/23.01, 23.04, 23.05, 23.07–23.1; 349/65
See application file for complete search history.

(56) References Cited

U.S. PATENT DOCUMENTS

| | | | | |
|---|---|---|---|---|
| 3,877,216 A * | 4/1975 | Mounce et al. | ............... | 368/108 |
| 6,617,993 B1 * | 9/2003 | Azadet | .......................... | 341/169 |
| 6,734,929 B2 | 5/2004 | Sugiura et al. | | |
| 6,842,279 B2 | 1/2005 | Amundson | | |
| 7,275,853 B2 | 10/2007 | Kano et al. | | |
| 7,920,320 B2 | 4/2011 | Watson et al. | | |
| 8,220,945 B2 * | 7/2012 | Huang et al. | .................... | 362/98 |
| 2003/0081407 A1 | 5/2003 | Bennett, Jr. | | |

(Continued)

FOREIGN PATENT DOCUMENTS

| | | |
|---|---|---|
| CN | 101739900 A | 6/2010 |
| CN | 101813865 A | 8/2010 |
| JP | 11184387 A | 7/1999 |
| JP | 2007257932 A | 10/2007 |

OTHER PUBLICATIONS

"Understanding Flash ADCs," Maxim, Application Note 810, Sep. 2010, 7 pages.

(Continued)

*Primary Examiner* — Bipin Shalwala
*Assistant Examiner* — Hang Lin
(74) *Attorney, Agent, or Firm* — Ryan, Mason & Lewis, LLP

(57) ABSTRACT

An illumination device comprises a plurality of light sources, light sequencing circuitry coupled to the light sources, a light guide structure for directing light from the plurality of light sources over a surface of a display screen to be illuminated, and a user interface for providing control input to the light sequencing circuitry. The light sequencing circuitry comprises a logic state machine responsive to the control input to select one of a plurality of available sequencing modes for the plurality of light sources, a code generator operative to generate output signals controlling respective ones of the light sources responsive to the selected one of the sequencing modes, and timing circuitry for defining timing intervals for processing of the control input by the logic state machine to determine the selected one of the sequencing modes and for generation of the corresponding output signals by the code generator.

21 Claims, 5 Drawing Sheets

(56) References Cited

U.S. PATENT DOCUMENTS

| | | | | |
|---|---|---|---|---|
| 2004/0008398 | A1 | 1/2004 | Amundson | |
| 2007/0236960 | A1* | 10/2007 | Anderson et al. | 362/627 |
| 2007/0273613 | A1 | 11/2007 | Mu et al. | |
| 2008/0298083 | A1 | 12/2008 | Watson et al. | |
| 2009/0007006 | A1* | 1/2009 | Liu et al. | 715/784 |
| 2009/0201249 | A1* | 8/2009 | Yamamoto | 345/157 |
| 2011/0037576 | A1* | 2/2011 | Jeon et al. | 340/407.2 |

OTHER PUBLICATIONS

"74F525 Programmable Counter," National Semiconductor Corporation, Aug. 1995, 10 pages.

A. Dachis, "Make an LED Ereader Light Overlay to See Your Ebooks at Night," Jun. 2011, 2 pages.

D. Ngo, "Enjoy Your Kindle at Night with the e-Luminator2," http://news.cnet.com/8301-17938_105-10293060-1.html, Jul. 2009, 2 pages.

"Amazon.com: Mighty Bright XtraFlex2 Clip-On Light (Kindle Version): Kindle Store" http://www.amazon.com/Mighty-Bright-XtraFlex2-Kindle-Version/dp/B003CFB8T2, 6 pages.

Google Results for "Kindle Lights", http://www.google.com/search?sourceid=navclient&ie=UTF-8&rlz=1T4GGLL_enUS380US380&q=kindle+ligts#q=kindle+lights&h1=en&r1z=1T4GGLL_enUS380US380&prmd=ivs&source=univ&tbs=shop:1&tbo=u&ei=t*m3TOYugvuXB8TO_b8M&sa=X&oi=product_result_group&ct=title&resnum=4&ved=0CD0QrQQwAw&fp=6248f386b3c06fd8, 3 pages.

* cited by examiner

*FIG. 4*

| INPUT | MODE | LED CONTROL |
|---|---|---|
| 1 PULSE/TIME PERIOD | MODE 1 | ROWS INDIVIDUALLY CONTROLLED |
| 2 PULSES/TIME PERIOD | MODE 2 | AUTOMATIC SEQUENCING AT RATE OF 1 ROW/SEC |
| 3 PULSES/TIME PERIOD | MODE 3 | AUTOMATIC SEQUENCING AT RATE OF 1 ROW/3 SEC |
| 4 PULSES/TIME PERIOD | MODE 4 | AUTOMATIC ALTERNATING TOP HALF/BOTTOM HALF |

*FIG. 5*

| | | | | | | |
|---|---|---|---|---|---|---|
| ROW 1 | 1 | 0 | 0 | 0 | ... | 0 |
| ROW 2 | 0 | 1 | 0 | 0 | ... | 0 |
| ROW 3 | 0 | 0 | 1 | 0 | ... | 0 |
| ROW 4 | 0 | 0 | 0 | 1 | ... | 0 |
| ... | 0 | 0 | 0 | 0 | ... | 0 |
| ROW $n$ | 0 | 0 | 0 | 0 | ... | 1 |

*FIG. 6*

| | | | |
|---|---|---|---|
| ROW 1 | 1 | ... | 0 |
| ROW 2 | 1 | ... | 0 |
| ... | ... | ... | ... |
| ROW $n-1$ | 0 | ... | 1 |
| ROW $n$ | 0 | ... | 1 |

ILLUMINATION DEVICE HAVING USER-CONTROLLABLE LIGHT SEQUENCING CIRCUITRY CONFIGURED TO SELECT A LIGHT SEQUENCING MODE

FIELD OF THE INVENTION

The present invention relates generally to illumination devices for providing enhanced viewing of a display screen under low ambient light conditions.

BACKGROUND OF THE INVENTION

Electronic readers are becoming increasingly popular. Many such devices incorporate electrophoretic displays or other types of display screens that are not backlit. These display screens therefore require an additional lighting source to allow the display screen to be read at night or under other low ambient light conditions.

One approach to addressing this issue is to incorporate a retractable reading lamp into the reader housing. The reading lamp is deployed as needed in order to provide the requisite illumination of the display screen. A similar approach is to use a detachable reading lamp that clips onto the housing.

Unfortunately, these approaches are problematic in that the reading lamp is cumbersome and can be easily bumped into and misaligned. Also, because of the angled illumination provided by such arrangements, glare is often introduced, making reading difficult. Moreover, the power consumption associated with such arrangements is often excessive, and can therefore quickly drain reader batteries. Similar problems arise with existing wedge-type illumination devices that are used in conjunction with electronic readers.

Alternative approaches incorporate side light sources directly into the reader housing. A problem with arrangements of this type is that user control of the light sources in unduly limited, resulting in inefficient lighting arrangements that can exhibit excessive power consumption. For example, in such arrangements a user generally cannot easily manipulate the light sources to illuminate desired portions of the display screen in a selected regular pattern that conforms to the reading speed and style of the user.

Accordingly, a need exists for improved illumination devices that overcome the drawbacks of the conventional approached described above.

SUMMARY OF THE INVENTION

An illustrative embodiment of the invention provides an improved illumination device having a simple and efficient user interface and associated light sequencing circuitry that allows a user to easily manipulate the light sources to illuminate desired portions of a display screen of an electronic reader or other display device. For example, the light sources can be controlled in accordance with a selected regular pattern that conforms to the reading speed and style of the user, thereby reducing power consumption while enhancing the user viewing experience under low ambient light conditions.

In one aspect, an illumination device comprises a plurality of light sources, light sequencing circuitry coupled to the light sources, a light guide structure for directing light from the plurality of light sources over a surface of a display screen to be illuminated, and a user interface for providing control input to the light sequencing circuitry. The light sequencing circuitry comprises a logic state machine responsive to the control input to select one of a plurality of available sequencing modes for the plurality of light sources, a code generator operative to generate output signals controlling respective ones of the light sources responsive to the selected one of the sequencing modes, and timing circuitry for defining timing intervals for processing of the control input by the logic state machine to determine the selected one of the sequencing modes and for generation of the corresponding output signals by the code generator.

In the above-noted illustrative embodiment, at least a subset of the timing intervals may comprise respective clock sample periods, and the logic state machine may be configured to select a particular one of the plurality of available sequencing modes by detecting a corresponding predetermined number of user input events of a first type, such as button press events, occurring within a given one of the clock sample periods. The logic state machine may be further configured to determine at least one operating parameter of the selected sequencing mode, such as a sequencing rate of the sequencing mode, based on a duration of a user input event of a second type, such as a button hold event, detected in at least one additional sample clock period subsequent to the given sample clock period.

The light guide structure may comprise a substantially planar light guide array having a plurality of separate light guides arranged substantially in parallel with one another and configured to direct light from respective ones of the light sources.

The display screen to be illuminated by the illumination device may be part of a separate display device, such as, for example, an electronic reader, a computer or a mobile telephone, and the substantially parallel light guides of the light guide structure are configured to overlay at least a portion of the display screen.

The present invention in one or more of the illustrative embodiments described herein overcomes the drawbacks of the conventional arrangements previously described. For example, an illumination device in accordance with such an embodiment can be readily aligned with the display screen, does not introduce glare, and conserves battery power.

BRIEF DESCRIPTION OF THE DRAWINGS

FIG. 4 shows exemplary sequencing modes provided by the light sequencing circuitry of FIG. 3.

FIGS. 5 and 6 show exemplary output signal logic states of a code generator of the light sequencing circuitry for two of the light sequencing modes of FIG. 4.

DETAILED DESCRIPTION OF THE INVENTION

The invention will be illustrated herein in conjunction with exemplary electronic readers, illumination devices, and associated light sequencing circuitry, all configured in a particular manner. It should be understood, however, that the invention is more generally applicable to any display screen illumination application in which it is desirable to provide improved user control over available light sources for enhanced viewing of the display at night or under other low ambient light conditions.

Figure 1A:
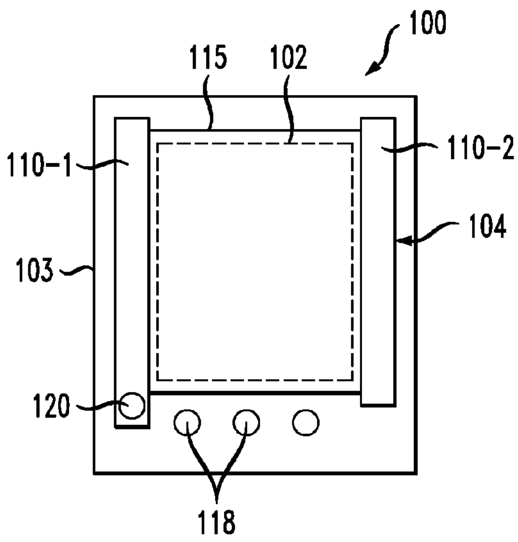
FIG. 1A shows an illumination device having a light guide structure arranged to overlay at least a portion of a display screen of an electronic reader in an illustrative embodiment.

FIG. 1A shows an electronic reader 100 that comprises a display screen 102 arranged within a housing 103 of the reader 100 so as to be viewable by a user. For example, the display screen may be exposed through an opening in the housing. The display screen 102 is assumed to be an electrophoretic display screen, or other type of display screen which requires additional illumination for proper viewing under low ambient light conditions.

Also shown in FIG. 1A is an illumination device 104 configured to overlay the display screen 102 of the electronic reader 100. The illumination device 104 generally comprises first and second edge support members 110-1 and 110-2 supporting a light guide structure 115 arranged therebetween. The use of two edge support members as shown is exemplary only, and in other embodiments more or fewer than two edge support members may be used. For example, an alternative embodiment may include only a single edge support member, arranged on any of the left, right, upper or lower sides of an associated light guide structure. One example of an alternative arrangement having a single edge support member will be described in greater detail below in conjunction with FIG. 9.

Figure 1B:
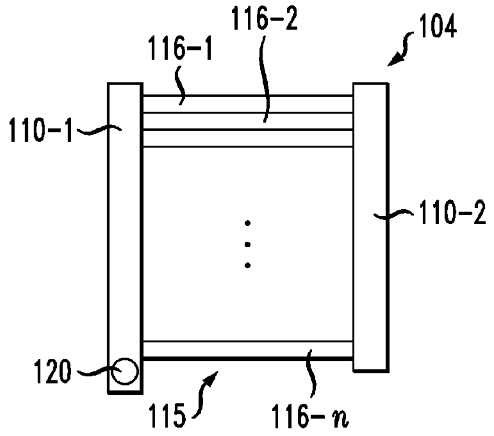
FIG. 1B shows the illumination device of FIG. 1A separate from the underlying electronic reader.

The illumination device 104 is shown separately from the reader 100 in FIG. 1B. As is apparent, the light guide structure 115 in this embodiment more particularly comprises a substantially planar light guide array having a plurality of separate light guides 116-1 through **116-*n* arranged substantially in parallel with one another between the first and second edge support members 110-1 and 110-2. The light guides may be made of transparent plastic or any other material suitable for propagating light along their length in a manner that serves to illuminate corresponding portions of the underlying display screen 102**. In other embodiments, the light guide structure need not comprise separate light guides, but may instead include, for example, other types of substantially planar arrangements of light guiding materials.

The illumination device 104 may be formed at least in part integrally with the housing 103. Alternatively, the illumination device 104 or portions thereof may be detachable from the housing or otherwise capable of being separated from the housing. The housing 103 may therefore include engagement or attachment mechanisms that mate with complementary mechanisms on the illumination device 104, although such mechanisms are not shown in the figures for clarity and simplicity of illustration.

The electronic reader 100 is an example of what is more generally referred to herein as a "display device." Such a display device may alternatively comprise a computer, a mobile telephone, or any other device having a display screen that requires additional illumination for viewing under low ambient light conditions. It is therefore to be appreciated that the invention is not limited to use with electronic readers, or with electrophoretic display screens. The display screen to be illuminated may be part of a separate display device and the substantially parallel light guides 116 of the light guide structure 115 may be configured to overlay at least a portion of that display screen.

The electronic reader 100 includes a number of user input buttons 118 on a lower front portion of the housing 103. The user input buttons 118 are used to control various conventional features of the electronic reader 100, such as selection of a particular book, turning pages of the book, and so on. Such features are well known and therefore will not be described in detail herein. The invention does not require any particular type of reader, reader interface or reader features, and is more generally applicable to a wide variety of other types of display devices having display screens.

The edge support member 110-1 of the illumination device 104 also includes a user input button 120 that allows a user to provide control input to light sequencing circuitry of the illumination device 104. One possible implementation of the light sequencing circuitry will be described in greater detail below in conjunction with FIG. 3.

It is to be appreciated that, although only a single user input button 120 is provided on the illumination device 104 in the present embodiment, other embodiments may include multiple buttons or other types of user input arrangements. Such arrangements may be viewed as examples of what is more generally referred to herein as a "user interface" of the illumination device, for providing control input to the light sequencing circuitry.

Figure 2:
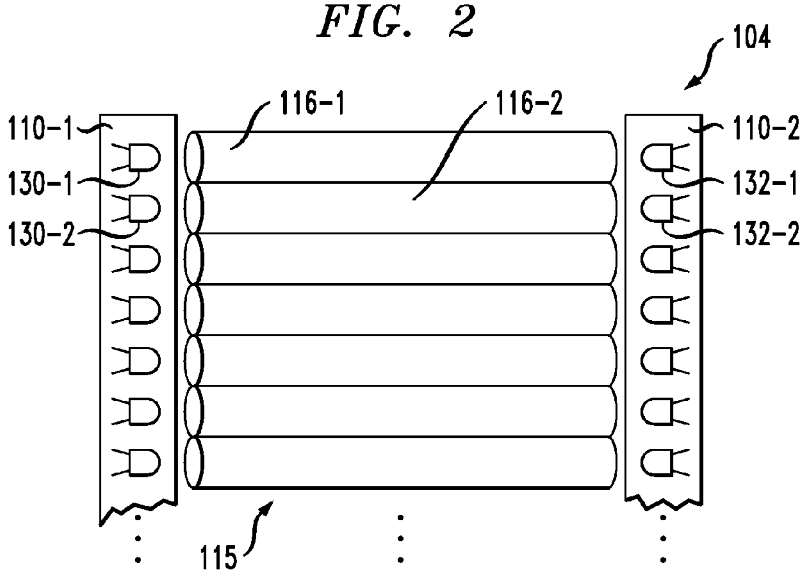
FIG. 2 is a more detailed view of a portion of the illumination device of FIGS. 1A and 1B.

FIG. 2 shows the edge support members 110 and light guide structure 115 of the illumination device 104 in greater detail. As shown, each of the separate light guides **116-*i* has associated therewith a corresponding pair of light sources, illustratively implemented in the present embodiment as light-emitting diodes (LEDs) 130-*i* and 132-*i* arranged in respective ones of the edge support members 110-1 and 110-2, where i=1, 2, . . . n. Thus, light guide 116-1 directs light from the LEDs 130-1 and 132-1 over a portion of the surface of the underlying display screen 102, light guide 116-2 directs light from the LEDs 130-2 and 132-2 over a portion of the surface of the underlying display screen 102, and so on for the remaining light guides 116 of the light guide structure 115**.

Accordingly, the LEDs 130 of the illumination device 104 are implemented as a first set of LEDs arranged substantially linearly along a first light-receiving edge of the light guide structure 115. Similarly, the LEDs 132 are implemented as an additional set of LEDs arranged substantially linearly along a second light-receiving edge of the light guide structure 115. Although there is a correspondence between pairs of LEDs and separate light guides in this embodiment, that is by way of example only, and a given light guide of the light guide structure may alternatively be configured to be shared by more than one LED 130 in edge support member 110-1 and more than one LED 132 in edge support member 110-2.

In other embodiments, only a single set of LEDs may be used, arranged in only one of the edge support members 110. As another possible alternative, the light guides 116 may be driven in an alternating fashion by LEDs from alternating edge support members, such that light guide 116-1 is driven only by LED 130-1, light guide 116-2 is driven only by LED 132-2, and so on. In an arrangement of this type, each edge support member would include only the LEDs for half of the light guides 116. Of course, light sources other than LEDs may be used in a given embodiment of the invention.

Although in the present embodiment the light guide structure 115 of the illumination device 104 completely covers the display screen 102, this is by way of illustrative example only. In other embodiments, the illumination device or its associated light guide structure may overlay only a portion of the display screen.

Figure 3:
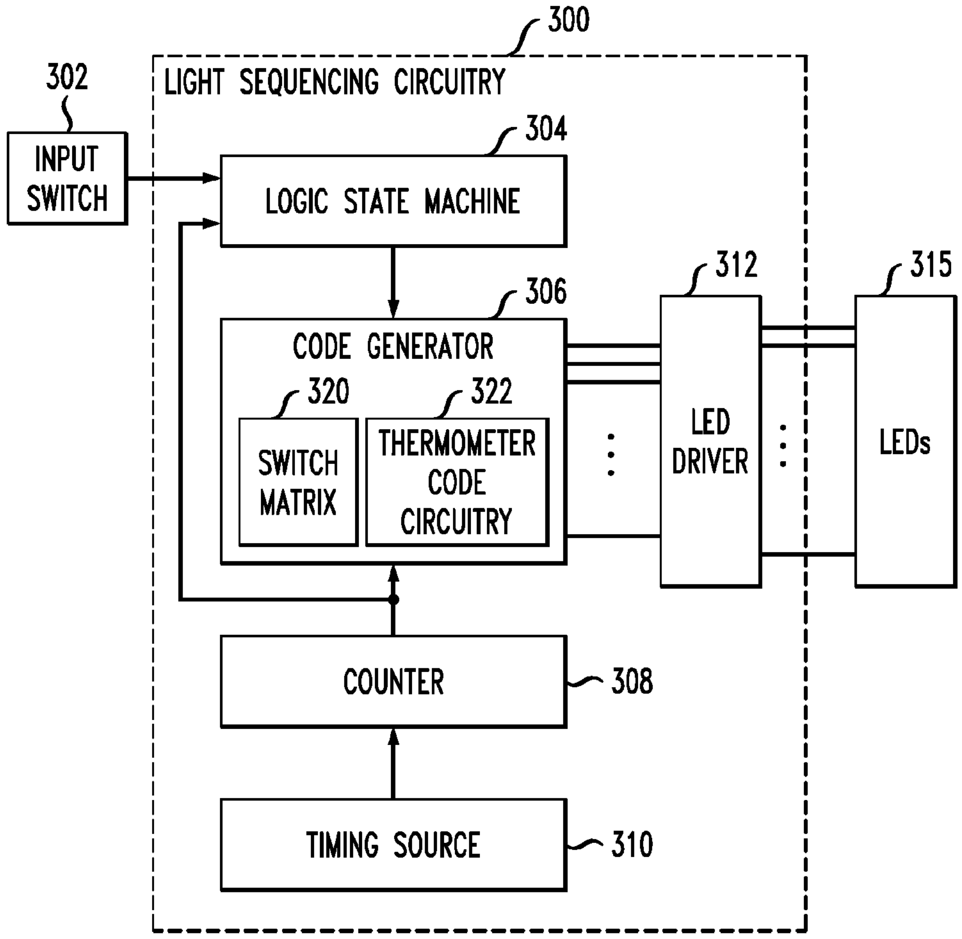
FIG. 3 is a block diagram showing light sequencing circuitry implemented in the illumination device of FIGS. 1A and 1B.

Referring now to FIG. 3, light sequencing circuitry 300 of the illumination device 104 is shown. The light sequencing circuitry 300 may be arranged in at least one of the edge support members 110 of the illumination device 104, such as the same edge support member that includes user input button

120. The light sequencing circuitry 300 is driven by input switch 302, and in this embodiment comprises a logic state machine 304, a code generator 306, a counter 308, a timing source 310, and an LED driver 312. The light sequencing circuitry 300 is coupled to LEDs 315, which correspond generally to at least a subset of the first and second sets of LEDs 130 and 132 as previously described.

The state of the input switch 302 is controlled by actuation of the user input button 120. The input switch may comprise, for example, a single N-type field effect transistor (FET) having its gate coupled to an output terminal of the input button 120, its drain coupled to an upper supply potential such as VDD and its source coupled to a lower supply potential such as ground potential. In such an arrangement, pushing the input button 120 causes a voltage to be applied the gate of the FET, turning the FET on, and releasing the input button removes the applied voltage from the gate of the FET, turning the FET off. Alternatively, the input switch 302 may comprise a P-type FET, or other arrangements of switching circuitry. Such switching circuitry in combination with the associated user input button 120 or other actuation mechanism is assumed to be encompassed by the term "user interface" as used herein. As noted above, such a user interface is utilized to provide control input to the light sequencing circuitry 300.

The input switch 302 may be combined with user input button 120. For example, such elements may be collectively implemented using an open-gate FET switch having a touch-sensitive input configured to utilize electrostatic charge from a user to control the current through the FET. Such an arrangement is also considered a type of user interface as that term is used herein. The user input button 120 therefore need not take any particular physical or mechanical form and in other embodiments may represent, for example, a touch-sensitive portion of the display screen itself, or another type of actuatable soft key.

The logic state machine 304 is operative responsive to the control input provided by user input button 120 and input switch 302 to select one of a plurality of available sequencing modes for illumination of the LEDs 315. More specifically, the logic state machine 304 in the present embodiment detects pulses from the input switch 302 and decodes them to determine a particular sequencing mode currently selected by the user. The decoding of the pulses is performed with respect to a sample clock period, as will be described in more detail below. The logic state machine can be configured using standard logic circuitry based on the sequencing modes to be implemented in the illumination device.

The code generator 306 is operative to generate output signals controlling respective ones of the LEDs 315 via the LED driver 312, responsive to the particular sequencing mode selected by the logic state machine 304. The code generator 306 in the present embodiment comprises a switch matrix 320 and thermometer code circuitry 322, which are used to generate different types of output signals for the various sequencing modes.

The counter 308 and timing source 310 may be collectively viewed as an example of what is more generally referred to herein as "timing circuitry." Such timing circuitry generally defines timing intervals for processing of the control input by the light sequencing circuitry 300. For example, the timing intervals established by the timing circuitry in the present embodiment comprise sample clock periods that are utilized by the logic state machine 304 to determine the selected one of the sequencing modes responsive to the control input provided via user input button 120 and input switch 302, and also for generation of the corresponding output signals by the code generator 306 for application to the LED driver 312. The timing source 310 may comprise, for example, a crystal oscillator that provides an output signal at a designated frequency to the counter 308. The counter 308 then divides that signal down to produce a sample clock signal having the desired sample clock period.

The LED driver 312 may comprise a set of PNP bipolar transistor driver circuits with one such driver circuit for each of the LEDs 315.

One or more of the elements of the light sequencing circuitry 300 may be implemented, by way of example and without limitation, utilizing a microprocessor, central processing unit (CPU), digital signal processor (DSP), application-specific integrated circuit (ASIC), field-programmable gate array (FPGA), or other type of processing device, as well as portions or combinations of these and other devices. Such processing devices may further comprise electronic memory such as random access memory (RAM) or read-only memory (ROM) for storing computer program code. A memory of this type may be viewed as an example of what is more generally referred to herein as a "computer program product" having executable computer program code embodied therein. The computer program code when executed in a processing device causes the processing device to perform functionality associated with one or more elements of the light sequencing circuitry 300. Accordingly, processing devices or portions thereof may be viewed as being part of or comprising light sequencing circuitry of the type disclosed herein.

Elements of the light sequencing circuitry may therefore be implemented at least in part in the form of one or more integrated circuits. For example, one or more of the logic state machine 304, code generator 306 and counter 308 may each be implemented as a separate integrated circuit or alternatively multiple such elements may be combined into a single integrated circuit. As a more particular example, portions of such elements may be implemented by appropriate configuration of an otherwise conventional programmable counter with logic for controlling output states, such as the 74F525 programmable counter from National Semiconductor.

In an integrated circuit implementation of the invention, multiple integrated circuit dies are typically formed in a repeated pattern on a surface of a wafer. Each such die may include a device as described herein, and may include other structures or circuits. The dies are cut or diced from the wafer, then packaged as integrated circuits. One skilled in the art would know how to dice wafers and package dies to produce packaged integrated circuits. Integrated circuits so manufactured are considered part of this invention.

FIG. 4 shows a number of examples of sequencing modes provided by the light sequencing circuitry 300 of FIG. 3. There are four modes shown, designated as Mode 1, Mode 2, Mode 3 and Mode 4, although more or fewer modes could be used in other embodiments. The particular sequencing mode is determined by the logic state machine 304 based on control input received in a given sample clock period established by the timing circuitry. A user causes the particular mode to be selected by manipulation of the user input button 120. More specifically, the user actuates the button a designated number of times within the given sample clock period in order to select a corresponding one of the sequencing modes. Thus, if the user pushes the button 120 once during the sample clock period, Mode 1 is selected. Similarly, if the user pushes the button 120 twice during the sample clock period, Mode 2 is selected. The other modes are selected in the same way, by pushing the button three or four times during the sample clock period to select Mode 3 or Mode 4, respectively. Such separate pushes of the user input control button 120 within a given sample clock period are referred to herein as "pulses" or "button push events," and may be viewed as examples of what are more generally referred to herein as "user input events."

The above-described selection mechanism is illustrated in the input column of FIG. 4, which indicates that inputs of one, two, three and four pulses per time period are used to select Mode 1, Mode 2, Mode 3 and Mode 4, respectively.

It should be noted that additional control input is provided in the present embodiment by the user pressing and holding the user input button 120. An event of this type is referred to herein as a "button hold event," which may be viewed as an example of another type of user input event. After selecting a particular sequencing mode by executing one or more button push events within a given sample clock period, a user can control certain features or other operating parameters of that sequencing mode, such as an automatic sequencing rate, by executing a button hold event of a particular duration. Such a button hold event may span one or more sample clock periods subsequent to the sample clock period in which the mode is selected.

Although the present embodiment utilizes two different types of user input events, namely, button press events and button hold events, other embodiments may utilize a wide variety of other types of user input events, in any combination, to control the selection of sequencing modes and adjustment of operating parameters of those modes. By way of example, another type of user input event that may be used to adjust the sequencing rate or other operating parameters of one or more of the sequencing modes includes user entry of information via one or more menus of a touch-sensitive display.

As shown in FIG. 4, each of the four different sequencing modes provides a different illumination sequence for the LEDs 315. It will be assumed in further describing these sequencing modes that the modes operate on a row basis, with each of n rows corresponding to one of the light guides 116-1 through **116-*n*. Each of these rows in the present embodiment has two LEDs associated therewith, one of the left side LEDs 130 and one of the right side LEDs 132, as shown in FIG. 2. Thus, illumination of one of the rows in accordance with a particular sequencing mode is assumed to activate both of the LEDs 130 and 132** of that row.

In Mode 1, the rows of LEDs are individually controlled. Thus, a user can sequence through particular rows of LEDs at any desired rate by simply executing a single button press event in each of a plurality of clock sample periods to move from activation of one row of LEDs to activation of the next row of LEDs. At an initial entry to Mode 1, only the first row of LEDs is activated, such that light from LEDs 130-1 and 132-1 is carried over first light guide 116-1. The next single button press event in a subsequent clock sample period will cause only the next row of LEDs to be activated, such that light from LEDs 130-2 and 132-2 is carried over second light guide 116-2. The user can similarly progress individually through the other rows of LEDs, with only one row being illuminated at a time, by repeatedly executing single button press events via user input button 120. A single button press event in a sample clock period following illumination of the final row n will cause the sequence to return to the first row. FIG. 5 shows the corresponding output signal logic states of the code generator 306 as applied to the LED driver 312 for the n rows over multiple sample clock periods in Mode 1.

In Mode 2, the rows of LEDs are automatically sequenced at a first default rate, namely, at a rate of one row per second. Thus, upon an initial entry to Mode 2, only the first row of LEDs is activated, such that light from LEDs 130-1 and 132-1 is carried over first light guide 116-1. After the first row has been activated for one second, only the next row of LEDs is activated, such that light from LEDs 130-2 and 132-2 is carried over second light guide 116-2. The sequence proceeds automatically through the rows of LEDs, with only one row being illuminated at a time for the designated amount of time. After the final row n is illuminated for the designated amount of time, the sequence automatically returns to the first row and is repeated for as long as Mode 2 remains the selected sequencing mode. As noted above, the sequencing rate of this automatic sequencing mode may be adjusted relative to the default rate of one row per second based on the duration of a button hold event that is executed subsequent to selection of the mode.

In Mode 3, the rows of LEDs are automatically sequenced at a second default rate which is lower than the first default rate of Mode 2. More specifically, the sequencing rate in Mode 3 is one row every three seconds, but the sequencing proceeds in substantially the same manner as previously described for Mode 2. Adjustments in sequencing rate relative to the default rate can again be made based on duration of a button hold event.

In Mode 4, first and second subsets of the rows of LEDs are alternately illuminated at a particular default rate. Assuming n is even, in this mode the rows of LEDs are separated into two halves, an upper or top half and a lower or bottom half, with the top half comprising rows 1 through n/2 and the bottom half comprising rows n/2+1 through n. FIG. 6 shows the corresponding output signal logic states of the code generator 306 as applied to the LED driver 312 for the n rows over multiple sample clock periods in Mode 4. The duration of a button hold event may be used to set the rate at which illumination alternates between the rows of the top half and those of the bottom half, in a manner similar to the setting of the sequencing rate relative to the default sequencing rate in Modes 2 and 3.

Figure 7:
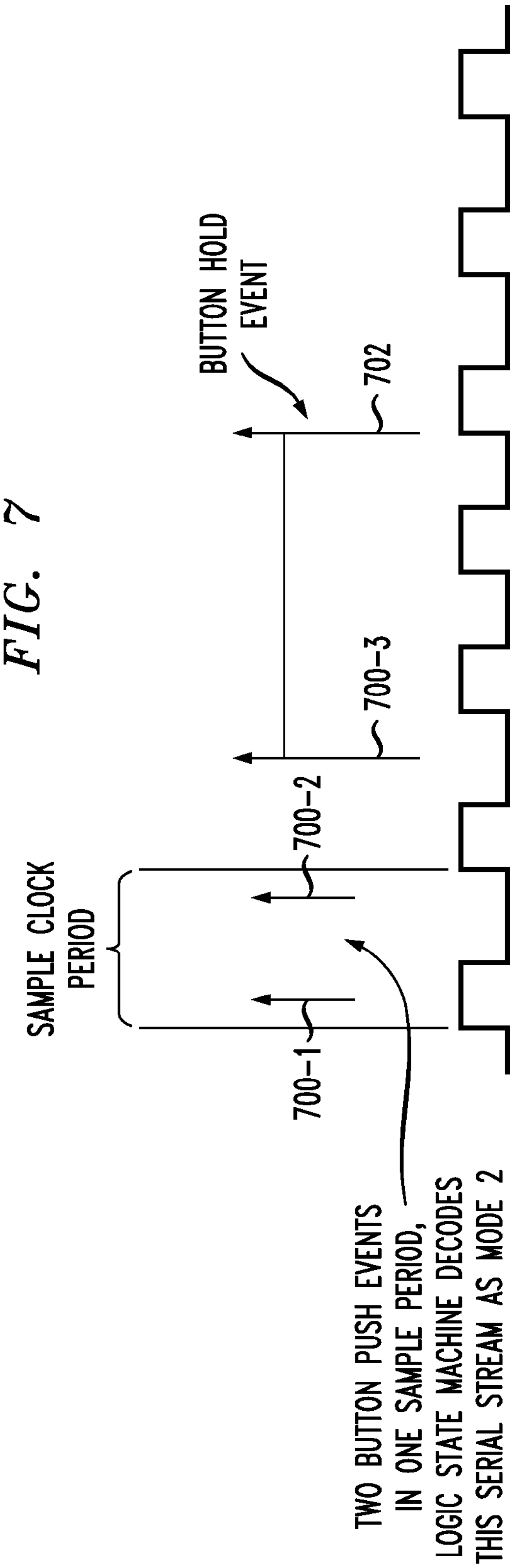
FIG. 7 is a timing diagram illustration the operation of a portion of the light sequencing circuitry for a particular one of the sequencing modes of FIG. 4.

As described above, in the present embodiment the number of distinct button push events detected by logic state machine 304 in a given sample clock period determines the sequencing mode. This sequencing mode selection process as implemented in the logic state machine 304 is illustrated in FIG. 7, which shows two button push events 700-1 and 700-2 being detected in a given sample clock period. The logic state machine 304 decodes this serial stream of button push events as indicating selection of Mode 2.

A subsequent button hold event is also illustrated in FIG. 7. The button hold event in this example is initiated by first pressing the user input button 120 as indicated at 700-3 and then holding it down until it is released as indicated at 702. The button is held for a period of time that spans multiple sample clock periods in this example, but any pressing and holding of the button that is initiated in a given sample clock period and continues past the end of that sample clock period may be detected as a button hold event. Again, the duration of the button hold down event is detected by the logic state machine 304 and may be used, for example, to set a sequencing rate associated with the selected sequencing mode.

Selection of particular sequencing modes and associated sequencing rates as described in conjunction with FIG. 4 advantageously allows the illumination of the display screen 102 to proceed in accordance with the individual reading speed and style of the user, while conserving device power by ensuring that only those LEDs that are actually needed are activated. These advantages are achieved in an illumination device overlay configuration that can be readily aligned with the display screen, and does not introduce glare.

It is to be appreciated that the particular sequencing modes described above are examples only, and numerous alternative modes can be provided in other embodiments. For example, different rates may be used for automatic sequencing of the type in Modes 2 and 3, or more than two subsets of rows may be alternately sequenced in a mode similar to Mode 4.

Figure 8:
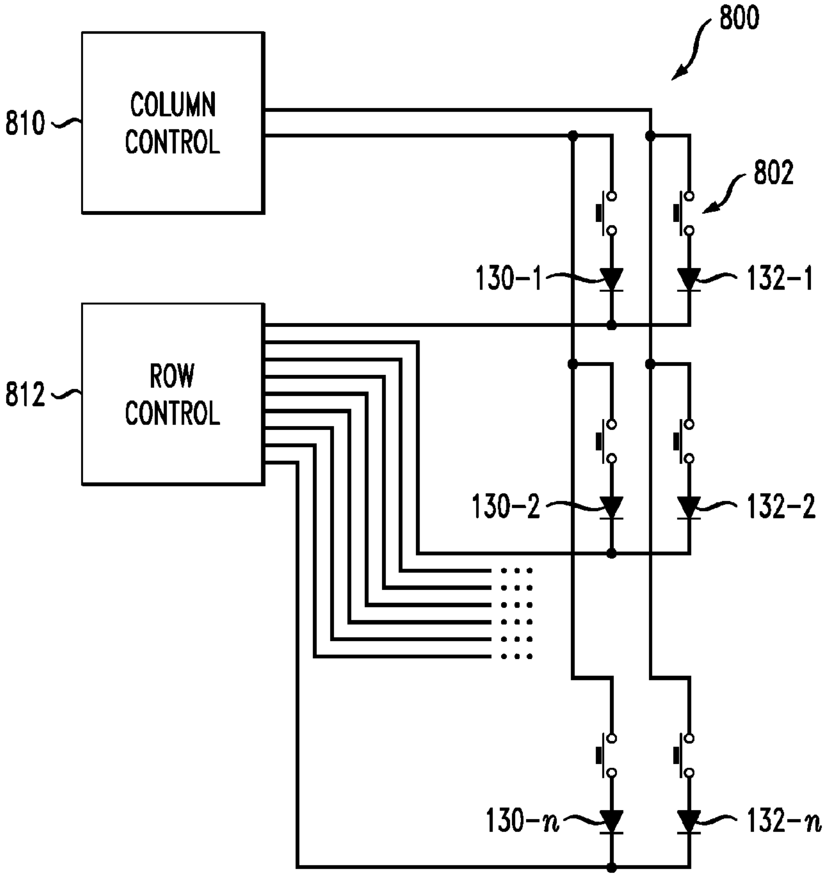
FIG. 8 shows a more detailed view of a switch matrix portion of the code generator in the light sequencing circuitry of FIG. 3.

The output signals for controlling the LEDs 315 in accordance with the selected sequencing mode are provided by the code generator 306 to the LED driver 312. These output signals may be generated for one or more of the modes at least in part using switch matrix 320, an exemplary portion of which is shown in FIG. 8. In this example, circuitry 800 comprises a switch matrix in the form of switches 802 arranged in n rows and two columns, with each of the switches being associated with one of the LEDs 130 or 132. One of the columns of LEDs is the set of LEDs 130 implemented in the first edge support member 110-1 and the other column of LEDs is the set of LEDs 132 implemented in the second edge support member 110-2. Also included in circuitry 800 is a column control element 810 and a row control element 812. Signals generated by these control elements control the states of switches 802 and thereby the illumination states of the associated LEDs. The control elements are driven by additional logic circuitry in the code generator in order to produce the desired sequencing for a given selected sequencing mode. The LED drivers are omitted from the circuitry 800 for clarity and simplicity of illustration.

Control of the switch matrix 320 in one or more of the sequencing modes may involve use of the thermometer code circuitry 322, which generates a thermometer code output responsive to an applied input signal. Implementations of thermometer code circuitry suitable for use in embodiments of the present invention are described in U.S. Pat. No. 6,617,993, entitled "Analog to Digital Converter Using Asynchronously Swept Thermometer Codes," which is commonly assigned herewith and incorporated by reference herein.

Figure 9:
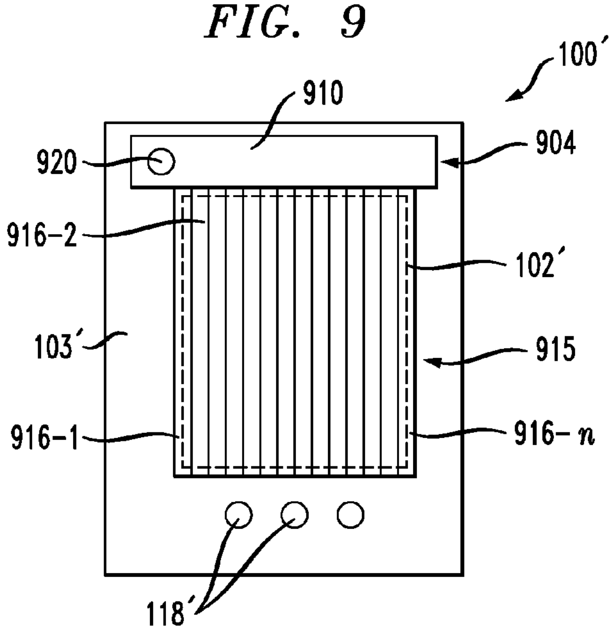
FIG. 9 shows an illumination device and associated electronic reader in another embodiment of the invention.

It was noted above that other embodiments of an illumination device in accordance with the present invention may include only a single edge support member, arranged on any of the left, right, upper or lower sides of an associated light guide structure. Referring now to FIG. 9, an example of such an alternative arrangement is shown. An illumination device 904 in this embodiment comprises a single edge support member 910 configured for arrangement along a top edge of a display screen 102' arranged in a housing 103' of an electronic reader 100' having user controls 118'. The reader 100' of FIG. 9 may be substantially the same as reader 100 of FIG. 1A, but may be particularly adapted for attachment of the illumination device 904. Alternatively, the illumination device 904 may be formed at least in part integrally with the housing 103' or other portions of the reader 100'.

The single edge support member 910 in the illumination device 904 supports a light guide structure 915 comprising n vertically arranged parallel light guides 116-1 through 116-*n*. Like the illumination device 104, the illumination device 904 comprises a single user input button 120. This user interface provides control input to light sequencing circuitry implemented in edge support member 910 for controlling a single column of LEDs with each such LED illuminating a corresponding one of the light guides 116. As in other embodiments, there need not be a separate light guide for each of the LEDs, and multiple LEDs may instead share a single light guide. Also, the light guide structure need not have separately identifiable light guides.

It should again be emphasized that the embodiments of the invention as described herein are intended to be illustrative only. For example, other illumination device embodiments may be configured in a straightforward manner by altering the particular arrangement of its light sources, light sequencing circuitry, light guide structure and user interface. These and numerous other alternative embodiments within the scope of the following claims will be readily apparent to those skilled in the art.

What is claimed is:

1. An illumination device comprising:

a plurality of light sources;

light sequencing circuitry coupled to the light sources;

a light guide structure for directing light from the plurality of light sources over a surface of a display screen to be illuminated; and a user interface for providing control input to the light sequencing circuitry;

wherein the light sequencing circuitry comprises:

a logic state machine responsive to the control input to select one of a plurality of available sequencing modes for the plurality of light sources;

a code generator operative to generate output signals controlling respective ones of the light sources responsive to the selected one of the sequencing modes; and timing circuitry for defining timing intervals for processing of the control input by the logic state machine to determine the selected one of the sequencing modes and for generation of the corresponding output signals by the code generator; and wherein at least a subset of the timing intervals comprise respective clock sample periods, and further wherein the logic state machine is configured to select a particular one of the plurality of available sequencing modes based at least in part on one or more user input events of a first type occurring within a given one of the clock sample periods, and to determine at least one operating parameter of the selected sequencing mode based at least in part on one or more user input events of a second type detected in at least one additional sample clock period subsequent to the given sample clock period.

2. The illumination device of claim 1 wherein the light sources comprise at least a first set of light-emitting diodes arranged substantially linearly along a first light-receiving edge of the light guide structure.

3. The illumination device of claim 2 wherein the light sources further comprise at least one additional set of light-emitting diodes arranged substantially linearly along at least one additional light-receiving edge of the light guide structure.

4. The illumination device of claim 1 wherein the plurality of sequencing modes comprises at least one mode in which each of at least a subset of the light sources is separately illuminated responsive to the control input.

5. The illumination device of claim 1 wherein the plurality of sequencing modes comprises at least a first mode in which the light sources are illuminated sequentially at a first predetermined rate and a second mode in which the light sources are illuminated sequentially at a second predetermined rate which is lower than the first rate.

6. The illumination device of claim 1 wherein the plurality of sequencing modes comprises at least one mode in which at least first and second designated subsets of the light sources are alternately illuminated.

7. The illumination device of claim 6 wherein the first subset comprises an upper portion of the light sources arranged along a particular light-receiving edge of the light guide structure and the second subset comprises a lower portion of the light sources arranged along the particular light-receiving edge.

8. The illumination device of claim 1 wherein the timing circuitry comprises a timing source coupled to a counter.

9. The illumination device of claim 8 wherein the timing source comprises a crystal oscillator.

10. The illumination device of claim 1 wherein the light guide structure comprises a substantially planar light guide array having a plurality of separate light guides arranged substantially in parallel with one another and configured to direct light from respective ones of the light sources.

11. The illumination device of claim 1 wherein the logic state machine is configured to select the particular one of the plurality of available sequencing modes by detecting a corresponding predetermined number of user input events of the first type occurring within the given clock sample period, and to determine the at least one operating parameter of the selected sequencing mode based on a duration of user input events of the second type detected in the at least one additional sample clock period.

12. A display device having the display screen and comprising the illumination device of claim 1 configured for providing illumination of said display screen under low ambient light conditions.

13. A method comprising the steps of:

establishing a timing interval for processing of control input applied to an illumination device, the timing interval comprising one or more clock sample periods;

processing the control input for the timing interval to select one of a plurality of available sequencing modes for a plurality of light sources of the illumination device; and generating output signals controlling respective ones of the light sources responsive to the selected one of the sequencing modes;

wherein the illumination device comprises a light guide structure for directing light from the plurality of light sources over a surface of a display screen to be illuminated; and wherein processing the control input further comprises:

selecting a particular one of the plurality of available sequencing modes based at least in part on one or more user input events of a first type occurring within a given one of the clock sample periods; and determining at least one operating parameter of the selected sequencing mode based at least in part on one or more user input events of a second type detected in at least one additional sample clock period subsequent to the given sample clock period.

14. The method of claim 13 wherein the step of generating output signals comprises generating the output signals in accordance with a thermometer code.

15. A computer program product comprising a non-transitory computer-readable storage medium having executable computer program code embodied therein, wherein the computer program code when executed in the illumination device causes the device to perform the steps of the method of claim 13.

16. A display device comprising:

a housing;

a display screen arranged within said housing; and an illumination device configured to overlay at least a portion of the display screen;

wherein the illumination device comprises:

a plurality of light sources;

light sequencing circuitry coupled to the light sources;

a light guide structure for directing light from the plurality of light sources over a surface of a display screen to be illuminated; and a user interface for providing control input to the light sequencing circuitry;

wherein the light sequencing circuitry comprises:

a logic state machine responsive to the control input to select one of a plurality of available sequencing modes for the plurality of light sources;

a code generator operative to generate output signals controlling respective ones of the light sources responsive to the selected one of the sequencing modes; and timing circuitry for defining timing intervals for processing of the control input by the logic state machine to determine the selected one of the sequencing modes and for generation of the corresponding output signals by the code generator; and wherein at least a subset of the timing intervals comprise respective clock sample periods, and further wherein the logic state machine is configured to select a particular one of the plurality of available sequencing modes based at least in part on one or more user input events of a first type occurring within a given one of the clock sample periods, and to determine at least one operating parameter of the selected sequencing mode based at least in part on one or more user input events of a second type detected in at least one additional sample clock period subsequent to the given sample clock period.

17. The display device of claim 16 wherein the display device comprises one of an electronic reader, a computer and a mobile telephone.

18. The display device of claim 16 wherein the illumination device is one of integral with said housing and detachable from said housing.

19. The illumination device of claim 1 wherein the at least one operating parameter comprises a sequencing rate for the selected sequencing mode.

20. The illumination device of claim 1 wherein the code generator comprises at least one of a switch matrix and thermometer code circuitry.

21. The illumination device of claim 10 wherein the display screen to be illuminated is part of a separate display device and the substantially parallel light guides of the light guide structure are configured to overlay at least a portion of the display screen.

* * * * *